(12) United States Patent
Yaghoobi et al.

(10) Patent No.: US 11,595,549 B2
(45) Date of Patent: Feb. 28, 2023

(54) AIRCRAFT INKJET PRINTING

(71) Applicant: The Boeing Company, Chicago, IL (US)

(72) Inventors: Ahmad R. Yaghoobi, Issaquah, WA (US); Matthew H. Mellin, Seattle, WA (US); Edward R. Greene, Seattle, WA (US); Kjersta L. Larson-Smith, Seattle, WA (US); Temourshah Ahmady, Issaquah, WA (US); Krishna P. Srinivasmurthy, Bothell, WA (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 16/856,006

(22) Filed: Apr. 22, 2020

(65) Prior Publication Data

US 2021/0331193 A1 Oct. 28, 2021

(51) Int. Cl.
*B05B 12/14* (2006.01)
*B41J 3/407* (2006.01)
*H04N 1/60* (2006.01)
*B05B 13/04* (2006.01)
*G06F 3/12* (2006.01)

(52) U.S. Cl.
CPC ....... *H04N 1/6058* (2013.01); *B05B 12/1472* (2013.01); *B05B 13/0431* (2013.01); *B41J 3/4073* (2013.01); *G06F 3/126* (2013.01); *G06F 3/1208* (2013.01); *G06F 3/1285* (2013.01); *H04N 1/60* (2013.01)

(58) Field of Classification Search
CPC combination set(s) only.
See application file for complete search history.

(56) References Cited

U.S. PATENT DOCUMENTS

| | | | |
|---|---|---|---|
| 7,352,491 | B2 | 4/2008 | Bala et al. |
| 8,545,943 | B2 | 10/2013 | Frankenberger et al. |
| 9,375,746 | B2 | 6/2016 | Heldt et al. |
| 9,446,426 | B2 | 9/2016 | Bausen et al. |
| 9,527,275 | B1 | 12/2016 | Flannigan et al. |

(Continued)

FOREIGN PATENT DOCUMENTS

| | | |
|---|---|---|
| JP | H0926866 A | 1/1997 |
| JP | 2002268855 A | 9/2002 |
| JP | 2012096503 A | 5/2012 |

OTHER PUBLICATIONS

Jacobson et al., "Robust Inside-Outside Segmentation using Generalized Winding Numbers," ACM Trans. Graph., 2013, 12 pages.

(Continued)

*Primary Examiner* — Helen Zong
(74) *Attorney, Agent, or Firm* — Yee & Associates, P.C.

(57) ABSTRACT

A method, apparatus, system, and computer program product for applying a color to an aircraft. The color for an exterior surface of the aircraft is determined by the computer system from a design of the aircraft. A position of the color in three-dimensional space is determined by the computer system. The position is in a color space coordinate system. An inkjet printer in the inkjet printers with a point cloud in the plurality of point clouds having a smallest Euclidean distance to the position of the color is selected by the computer system. The inkjet printer is used to apply the color on the exterior surface of the aircraft.

43 Claims, 11 Drawing Sheets

(56) References Cited

U.S. PATENT DOCUMENTS

| | | | |
|---|---|---|---|
| 10,307,788 B2 | 6/2019 | Arthur et al. | |
| 2005/0099455 A1* | 5/2005 | Payne | H04N 1/56 347/43 |
| 2010/0304009 A1 | 12/2010 | Bausen et al. | |
| 2013/0278654 A1* | 10/2013 | Ito | B41J 11/006 347/6 |
| 2013/0293606 A1* | 11/2013 | Maltz | H04N 1/6061 347/9 |
| 2015/0042716 A1 | 2/2015 | Beier et al. | |
| 2019/0016121 A1* | 1/2019 | Baker | B41J 2/04508 |
| 2020/0162639 A1* | 5/2020 | Gonsor | G06F 3/121 |
| 2021/0272235 A1* | 9/2021 | Zeng | G06T 3/4007 |
| 2021/0331193 A1* | 10/2021 | Yaghoobi | H04N 1/6058 |

OTHER PUBLICATIONS

European Patent Office Extended Search Report, dated Sep. 29, 2021, regarding Application No. EP21168684-5, 8 pages.

\* cited by examiner

400
COLOR CODE (L, A, B) AND DISTANCE FROM INKJET POINT CLOUD

| COLOR CODE (402) | L, a, b (404) | dE (406) | L, a, b (NEAREST POINT CLOUD) (408) | INKJET (410) |
|---|---|---|---|---|
| COLOR A (420) | 30.51,47.2675 30.6075 | 0.949434909 | 30.798,44.4581,44.4581 | INKJET1 |
| | | 2.629895818 | 31.3639,39.5348,39.5348 | INKJET2 |
| | | 0.949434909 | 30.798,44.4581,44.4581 | INKJET3 |
| | | 0.771423554 | 30.5463,44.9083,44.9083 | INKJET4 |
| | | 4.519655834 | 32.2432,34.6563,34.6563 | INKJET5 |
| COLOR B (422) | 31.185,52.6 40.2075 | 2.308645205 | 31.9085,45.2265,45.2265 | INKJET1 |
| | | 3.828411507 | 32.1445,40.2606,40.2606 | INKJET2 |
| | | 2.308645205 | 31.9085,45.2265,45.2265 | INKJET3 |
| | | 2.084864427 | 31.8922,45.9983,45.9983 | INKJET4 |
| COLOR C (424) | 29.1225,49.48 37.3525 | 2.135989576 | 29.5168,42.7278,42.7278 | INKJET1 |
| | | 3.671332187 | 30.2113,38.2887,38.2887 | INKJET2 |
| | | 2.135989576 | 29.5168,42.7278,42.7278 | INKJET3 |
| | | 1.878399871 | 29.8718,43.9278,43.9278 | INKJET4 |
| COLOR D (426) | 33.245,54.4575 42.395 | 2.170779059 | 34.0007,47.4339,47.4339 | INKJET1 |
| | | 3.651809673 | 34.5694,42.7567,42.7567 | INKJET2 |
| | | 2.170779059 | 34.0007,47.4339,47.4339 | INKJET3 |
| | | 1.898648284 | 33.919,48.3337,48.3337 | INKJET4 |
| | | 5.759677641 | 35.48,37.1277,37.1277 | INKJET5 |
| COLOR E (428) | 34.87,55.2525 42.7275 | 1.911628863 | 35.2818,48.74,48.74 | INKJET1 |

FIG. 4

AIRCRAFT INKJET PRINTING

BACKGROUND INFORMATION

1. Field

The present disclosure relates generally to manufacturing aircraft and, in particular, to a method, apparatus, system, and computer program product for printing a color on an aircraft using an inkjet printing system.

2. Background

Aircraft such as passenger airplanes are commonly painted. The combination of colors, graphics, and typographical identifiers for a set of insignia for the aircraft is referred to as an aircraft livery. The aircraft livery can include a title and a monogram or an emblem as well as other graphical elements on the exterior of the aircraft.

The title can have a specific style with a particular typeface, type size, type case, proportion, and other parameters. The emblem can have a particular geometry that results in a logo for promoting recognition of a particular airline or other customer. Painting these designs on the aircraft with the selected colors to form the aircraft livery can be challenging.

Therefore, it would be desirable to have a method and apparatus that take into account at least some of the issues discussed above, as well as other possible issues. For example, it would be desirable to have a method and apparatus that overcome a technical problem with painting aircraft liveries.

SUMMARY

An embodiment of the present disclosure provides a method for applying a color to an aircraft. The color for an exterior surface of the aircraft is determined by the computer system from a design of the aircraft. A position of the color in three-dimensional space is determined by the computer system. The position is in a color space coordinate system. An inkjet printer in the inkjet printers with a point cloud in the plurality of point clouds having a smallest Euclidean distance to the position of the color is selected by the computer system. The inkjet printer is used to apply the color on the exterior surface of the aircraft.

Another embodiment of the present disclosure provides a method for applying a color to an object. A determination is made by computer system as to whether a position of the color selected for the object is within a point cloud defining color application capabilities for an inkjet printer. The position is in three-dimensional space for a color space. The inkjet printer is selected by the computer system for use to apply the color to the object when the color is within the point cloud defining the color application capabilities of the inkjet printer.

Still another embodiment of the present disclosure provides an automated color system comprising a computer system and a color manager in the computer system. The color manager is configured to determine a color for an exterior surface of an aircraft from a design of the aircraft. The color manager is configured to determine a position of the color in three-dimensional space. The position is in a color space coordinate system. The color manager is configured to determine whether a Euclidean distance from the position of the color is zero to any of a plurality of point clouds defining color application capabilities for inkjet printers, wherein points in the plurality of point clouds represent colors that can be applied by the inkjet printers. The color manager is configured to select an inject printer in the inkjet printers with a point cloud in the plurality of point clouds having a smallest Euclidean distance to the position of the color, wherein the inkjet printer is used to apply the color to the exterior surface of the aircraft.

Yet another embodiment of the present disclosure provides an automated color system comprising a computer system and a color manager in the computer system. The color manager is configured to determine whether a position of a color selected for an object is within a point cloud defining color application capabilities for an inkjet printer. The position is in three-dimensional space for a color space. The color manager is configured to select the inkjet printer for use to pain the object with the color when the color is within the point cloud defining color application capabilities of the inkjet printer.

Still another embodiment of the present disclosure provides a computer program product for applying a color to an aircraft. The computer program product comprises a computer-readable storage media first program code, second program code, third program code, and fourth program code stored on the computer-readable storage media. The first program code is executable by a computer system to cause the computer system to determine the color for an exterior surface of the aircraft from a design of the aircraft. The second program code executable by a computer system to cause the computer system to determine a position of the color in three-dimensional space. The position is in a color space coordinate system. The third program code is executable by a computer system to cause the computer system to determine whether a Euclidean distance from the position of the color is zero to any of a plurality of point clouds defining color application capabilities for inkjet printers, wherein points in the plurality of point clouds represent colors that can be applied by the inkjet printers. The fourth program code is executable by a computer system to cause the computer system to select an inject printer in the inkjet printers with a point cloud in the plurality of point clouds having a smallest Euclidean distance to the position of the color. The inkjet printer is used to apply the color to the exterior surface of the aircraft.

Yet another embodiment of the present disclosure provides a computer program product for applying a color to an aircraft. The computer program product comprises first program code and second program code stored on the computer-readable storage media. The first program code is executable by a computer system to cause the computer system to determine whether a position of the color selected for an object is within a point cloud defining color application capabilities for an inkjet printer, wherein the position is in three-dimensional space for a color space. The second program code is executable by a computer system to cause the computer system to select the inkjet printer for use to pain the object with the color when the color is within the point cloud defining color application capabilities of the inkjet printer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of Euclidean distances determined for colors to point clouds in accordance with an illustrative embodiment;

DETAILED DESCRIPTION

Figure 1:
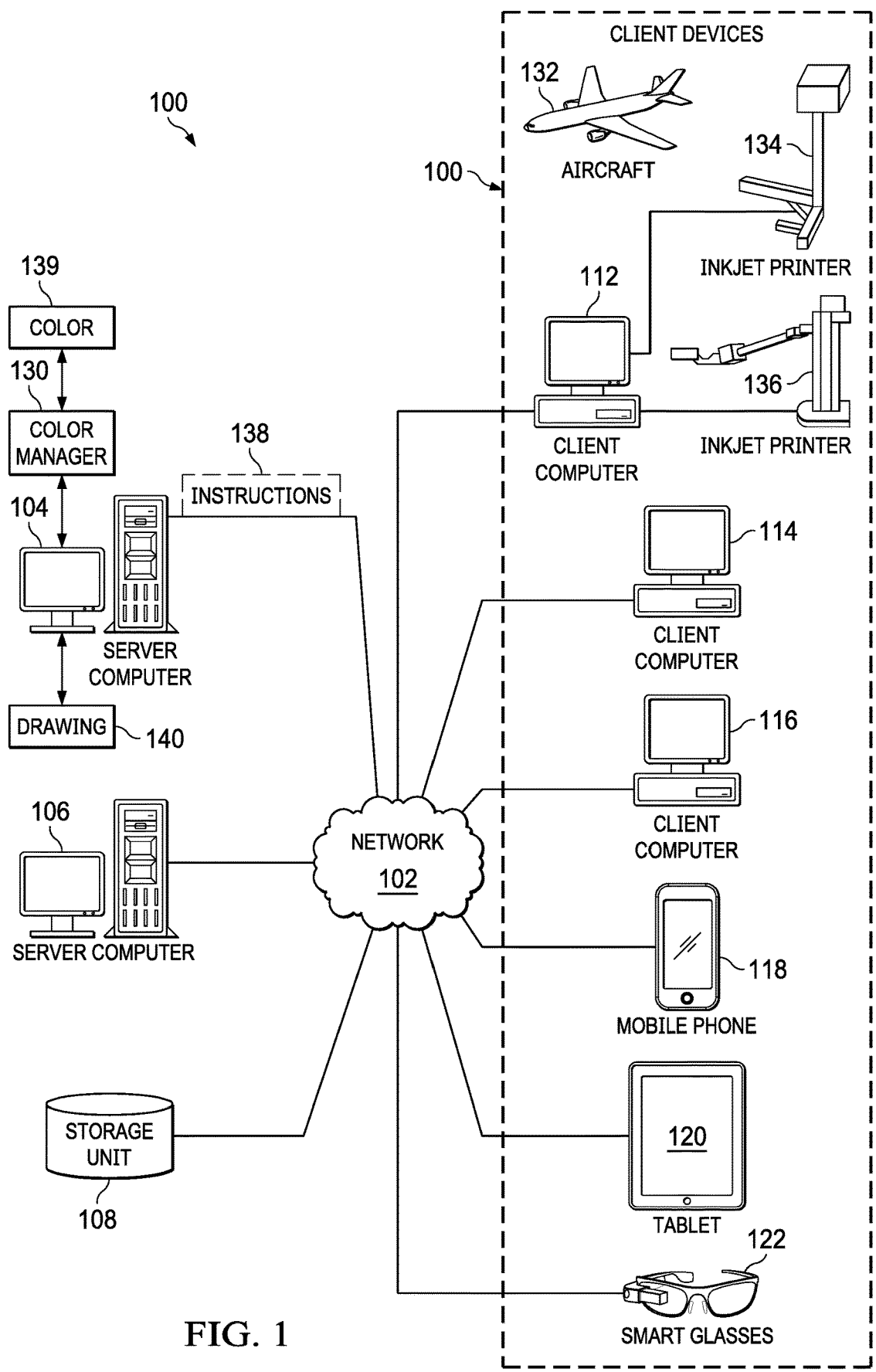
FIG. 1 is a pictorial representation of a network of data processing systems in which illustrative embodiments may be implemented.

The illustrative embodiments recognize and take into account one or more different considerations. For example, the illustrative embodiments recognize and take into account that currently a customer can request a particular configuration of colors to be painted on an exterior of an aircraft to form an exterior aircraft livery for the aircraft. The illustrative embodiments recognize and take into account that color codes for the colors can be extracted from designs for aircraft such as aircraft livery documents.

The illustrative embodiments recognize and take into account that painting lettering, emblems, and other design elements for an aircraft livery can be more complex than desired. For example, the illustrative embodiments recognize and take into account that when the lettering, emblems, and other design elements are complex, these designs elements are built up layer by layer in a time-consuming process. In some cases, the illustrative embodiments recognize and take into account that a level of complexity of designs are printed onto decals or stickers that are applied to the exterior of the aircraft. The illustrative embodiments recognize and take into account that the decals or stickers can work well, but add undesired weight to an aircraft. The illustrative embodiments recognize and take into account that the decals or stickers can degrade over time.

The illustrative embodiments recognize and take into account that current techniques for identifying color codes for paints for an aircraft livery can be more tedious and error-prone. The illustrative embodiments recognize and take into account that as a number of graphical elements and colors for those graphical elements increase in an aircraft livery, the time needed to identify the color codes for the colors and mixing the paints for those colors becomes greater than desired. Further, the illustrative embodiments recognize and take into account that the likelihood of errors increases as the number of graphical elements and colors increases when identification of the color codes is performed by a human operator. The illustrative embodiments also recognize and take into account that mixing paints for different color codes can also be tedious and time-consuming.

Thus, the illustrative embodiments provide a method, apparatus, system, and computer program product for painting aircraft. The illustrative embodiments recognize and take into account that the painting can be performed using inkjet printers. The illustrative embodiments recognize and take into account that designs can be painted or "printed" onto an exterior surface of an aircraft using an inkjet printer.

In one illustrative example, a color is printed on an object. A determination is made as to whether a position of the color selected for the object is within a point cloud defining color printing capabilities for a particular inkjet printer. The position is in a three-dimensional space for a color space. The particular inkjet printer is selected for use to print the object with the color when the color is within the point cloud defining the color printing capabilities of the particular inkjet printer.

In another illustrative example, a color is printed on an aircraft. The color for an exterior surface of the aircraft is determined from a design of the aircraft. A position of the color in a three-dimensional space is determined. The position is described using a color space coordinate system. A determination is made as to whether a Euclidean distance from the position of the color is zero to any of a plurality of point clouds defining color printing capabilities for inkjet printers. Points in the plurality of point clouds represent colors that can be printed by the inkjet printers. An inkjet printer in the inkjet printers with a point cloud in the plurality of point clouds having a smallest Euclidean distance to the position of the color is selected. The inkjet printer is used to print the color on the exterior surface of the aircraft.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, color manager 130 runs on server computer 104. Color manager 130 operates to print color 139 on aircraft 132.

In this illustrative example, color manager 130 controls at least one of inkjet printer 134 or inkjet printer 136 to apply one or more colors on the surface of aircraft 132. As depicted, color manager 130 can control these inkjet printers by sending instructions 138 to client computer 112. In turn, client computer 112 sends the appropriate instructions as signals to at least one of inkjet printer 134 or inkjet printer 136.

In this illustrative example, instructions 138 can be at least one of color information, coordinates defining a surface area for printing, program code, inkjet printer settings, or other suitable information. In this illustrative example, instructions 138 are sent over network 102 using Transmission Control Protocol/Internet Protocol (TCP/IP). Instructions 138 can be sent as part of a flow of data on network 102 in which instructions 138 can be placed into data packets. Further, tunneling protocols can be used to provide private network communications between server computer 104 and client computer 112.

In this illustrative example, in generating instructions 138, color manager 130 determines color 139 for the exterior surface of aircraft 132. This color can be determined using a design for aircraft 132 such as drawing 140.

In this illustrative example, drawing 140 can be a two-dimensional or three-dimensional drawing of aircraft 132. Drawing 140 can be in a computer-aided design file or generated from a computer-aided design file for aircraft 132. In this illustrative example, drawing 140 contains information such as color codes and surface areas where the color is to be painted. This information can be obtained from at least one of metadata for drawing 140 or processing of drawing 140.

For example, drawing 140 can be processed using at least one of image processing, text extraction, computational analysis, visual analytics, or other techniques to obtain information about color 139 in a surface area in which color 139 is to be applied to aircraft 132. The surface area can be contiguous or noncontiguous. The surface area can be part of the design for the aircraft livery for aircraft 132.

In this illustrative example, with the identification of color 139 for aircraft 132, color manager 130 determines whether color 139 is inside or outside of the color range of inkjet printer 134 and inkjet printer 136.

The determination of whether the color is within the color range of the inkjet printers can be made by determining whether color 139 is within a point cloud for each of the inkjet printers. The color range of the inkjet printer is the colors that the inkjet printer can apply. These point clouds represent color spaces for the color ranges for inkjet printer 134 and inkjet printer 136.

If the color is outside of the point clouds for these inkjet printers, color manager 130 can determine a distance of color 139 to each of the point clouds. The inkjet printer having the point cloud with the smallest Euclidean distance that is within a threshold distance can be used to apply color 139 to aircraft 132. If the closest distance to one of the point clouds for these two inkjet printers is greater than a threshold distance, then inkjet printer 134 and inkjet printer 136 may not be able to apply another color that is sufficiently close to color 139. In this case, a customer can be consulted as to whether the closest color to color 139 is acceptable, whether another inkjet printer can be considered, or some other action can be taken.

When an inkjet printer is selected to apply color 139, color manager 130 sends instructions 138 to client computer 112 to apply color 139 to aircraft 132 using the selected inkjet printer.

Figure 2:
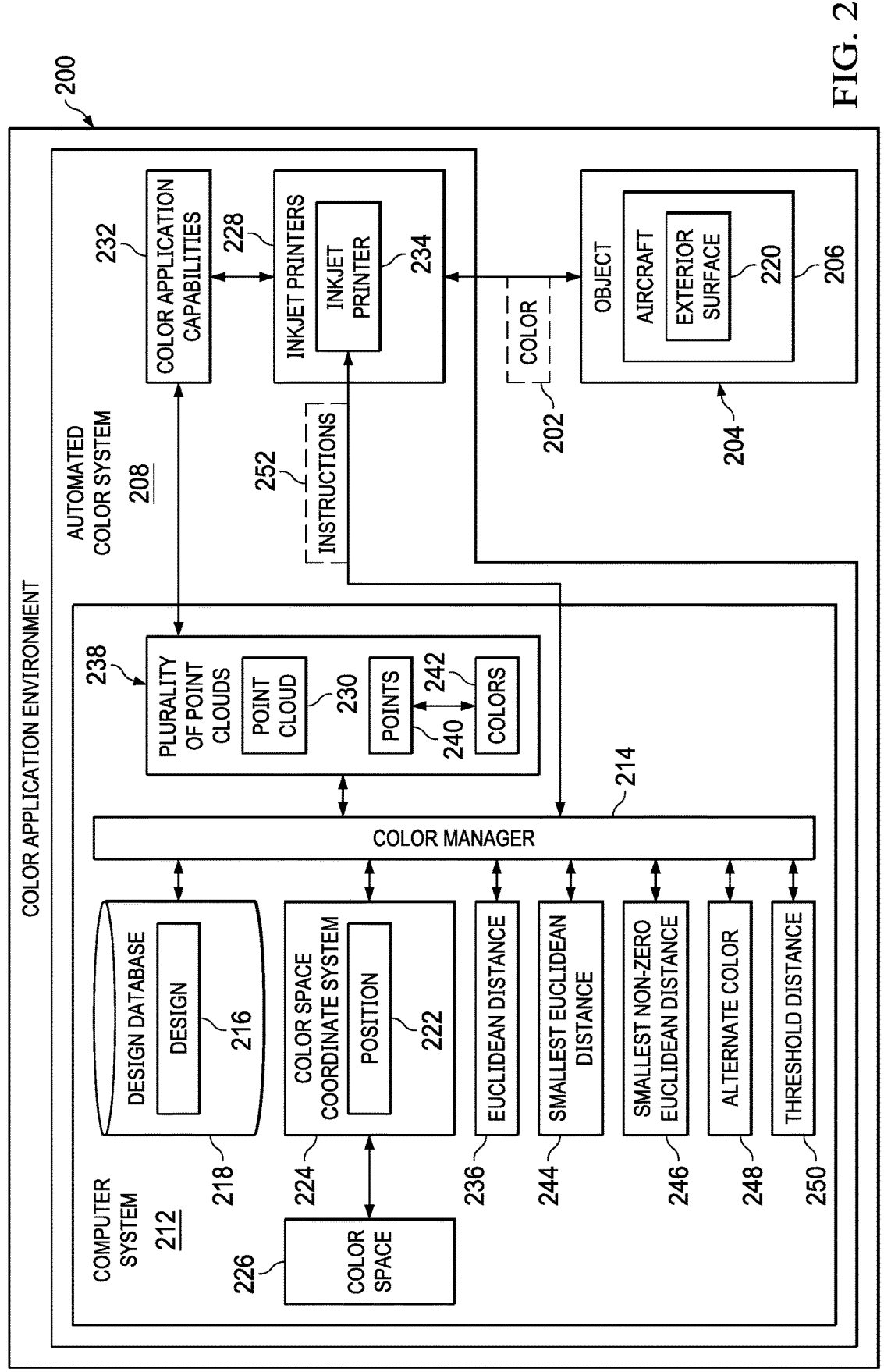
FIG. 2 is an illustration of a block diagram of a color application environment in accordance with an illustrative embodiment.

With reference now to FIG. 2, an illustration of a block diagram of a color application environment is depicted in accordance with an illustrative embodiment. In this illustrative example, color application environment 200 includes components that can be implemented in hardware such as the hardware shown in network data processing system 100 in FIG. 1.

In color application environment 200, color 202 can be applied to object 204. Object 204 can take a number of different forms. For example, object 204 can be selected from a group comprising a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a skin panel, a wall, a door, a fuselage, an engine housing, a wing, a fairing, and other suitable types of objects.

In this illustrative example, automated color system 208 operates to apply color 210 to object 204 such as aircraft 206 or some other type of object. As depicted, automated color system 208 comprises computer system 212 and color manager 214 in computer system 212.

Color manager 214 can be implemented in software, hardware, firmware, or a combination thereof. When software is used, the operations performed by color manager 214 can be implemented in program code configured to run on hardware, such as a processor unit. When firmware is used, the operations performed by color manager 214 can be implemented in program code and data and stored in persistent memory to run on a processor unit. When hardware is employed, the hardware can include circuits that operate to perform the operations in color manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, color manager 214 in computer system 212 can operate to identify color 202 for object 204 from design 216. Design 216 is information in an electronic form located in one or more files in design database 218. In this illustrative example, design 216 can be a two-dimensional or three-dimensional design of object 204. Design 216 can be, for example, a computer-aided design in a data structure such as a file or other suitable object that can be stored on a computer-readable medium in computer system 212. Design 216 can be, for example, a two-dimensional drawing with text and legends describing a color scheme such as an aircraft livery when object 204 is aircraft 206.

Color manager 214 can process design 216 to determine color 202 selected for object 204. For example, color 202 can be for use on exterior surface 220 of aircraft 206.

This determination of color 202 can include, for example, locating metadata for design 216 in which the metadata identifies color 202. The information identifying color 202 can be a color code, a color space value, or some other description.

With the identification of color 202, color manager 214 determines position 222 of color 202 in a three-dimensional space. Position 222 of color 202 in space is described using color space coordinate system 224 for color space 226.

In this illustrative example, a color space is an organization of colors. Color space 226 contains information that enables reproducing colors such as color 202. This information is represented in color space coordinate system 224. As depicted, color space 226 can be selected from at least one of a LAB color space, an LMS color space, an XYZ color space, or other suitable types of color spaces.

In this illustrative example, inkjet printers 228 can be used to apply color 202 to object 204. In this illustrative example, inkjet printers 228 can be implemented using currently available inkjet printers designed for industrial use such as for applying colors to vehicles such as automobiles or aircraft. In this illustrative example, inkjet printers 228 can take the form of robots having printheads that are suitable for applying color 202 to object 204 such as aircraft 206.

Inkjet printers 228 can apply color 202 to object 204 in a number of different ways. For example, inkjet printers 228 can apply color 202 by painting or printing color 202. In this illustrative example, inkjet printers 228 can apply color 202 by at least one of painting or printing.

For example, paint can be a liquid comprised of a pigment, a solvent, and a binder. Ink can be a liquid that is translucent and comprised primarily of a pigment and a solvent with a smaller fraction of a binder. The paint has a higher viscosity than the ink. Further, the pigment in the paint may not be as soluble in the solvent as compared to the ink.

In this illustrative example, color manager 214 can determine whether position 222 of color 202 selected for object 204 is within point cloud 230 defining color application capabilities 232 for inkjet printer 234. As depicted, color manager 214 can select inkjet printer 234 in inkjet printers 228 for use to apply color 202 to object 204 when color 202 is within point cloud 230 defining color application capabilities 232 of inkjet printer 234.

For example, in selecting inkjet printer 234, color manager 214 can determine position 222 of color 202 in a three-dimensional space and determine whether Euclidean distance 236 from position 222 of color 202 is zero to any of plurality of point clouds 238 defining color application capabilities 232 for inkjet printers 228. In this example, points 240 in plurality of point clouds 238 represent colors 242 that can be applied by inkjet printers 228 to object 204 such as aircraft 206.

As depicted, color manager 214 can select inkjet printer 234 in inkjet printers 228 with point cloud 230 in plurality of point clouds 230 having smallest Euclidean distance 244 to position 222 of color 202. Based on the selection, color manager 214 can use inkjet printer 234 to apply color 202 to object 204 such as on exterior surface 220 of aircraft 206.

In selecting an inkjet printer, color manager 214 can identify inkjet printer 234 in inkjet printers 228 with point cloud 230 in plurality of point clouds 238 having Euclidean distance 236 of zero to position 222 of color 202. Further, color manager 214 can identify inkjet printer 234 in inkjet printers 228 with point cloud 230 in plurality of point clouds 238 having smallest non-zero Euclidean distance 246 to position 222 of color 202 when Euclidean distance 236 of zero is absent from position 222 of color 202 to plurality of point clouds 238.

In this illustrative example, smallest non-zero Euclidean distance 246 to color 202 is represented as alternate color 248 that is an approximation of color 202. As depicted, color manager 214 can use alternate color 248 in place of color 202 when smallest non-zero Euclidean distance 246 is within threshold distance 250.

Further, if more than one inkjet printer in inkjet printers 228 has a zero distance for Euclidean distance 236, those inkjet parameters have the capability to apply color 202. In this case, the selection of a particular inkjet printer from these inkjet printers having a zero distance for Euclidean distance 236 can be based on various parameters selected from at least one of a color application speed, a cost, and a number of colors that can be applied. The number of colors that can be applied includes determining if more than one color to be applied to an object all fall within the same point cloud for a particular inkjet printer. For example, if two colors are to be applied and the first color falls within all three of the point clouds for three inkjet printers and the second color only falls within one of the point clouds for the three inkjet printers, the inkjet printer in which the two colors fall within in the point cloud for the inkjet printers is selected.

With the selection of inkjet printer 234 in inkjet printers 228, color manager 214 can generate instructions 252. In this illustrative example, instructions 252 represent instructions that can be used to control the operation of inkjet printer 234 to apply color 202 to object 204, such as aircraft 206. In this illustrative example, instructions 252 are sent directly to inkjet printer 234 or to a computer or some other type of controller that controls the operation of inkjet printer 234. This computer or controller can be located within or externally to inkjet printer 234.

In one illustrative example, one or more technical solutions are present that overcome a technical problem with applying colors to an aircraft. As a result, one or more technical solutions can provide a technical effect of enabling applying a color to an aircraft or some other type of object more quickly as compared to current techniques. In the illustrative example, one or more technical solutions enable reducing the time needed to identify an inkjet printer to apply one or more colors for an aircraft livery or a color scheme for other objects from a design such as a drawing.

Computer system 212 can be configured to perform at least one of the steps, operations, or actions described in the different illustrative examples using software, hardware, firmware, or a combination thereof. As a result, computer system 212 operates as a special purpose computer system in which color manager 214 in computer system 212 enables identifying an appropriate inkjet printer for applying a color to an object. In particular, color manager 214 transforms computer system 212 into a special purpose computer system as compared to currently available general computer systems that do not have color manager 214.

In the illustrative example, the use of color manager 214 in computer system 212 integrates processes into a practical application for a method for applying a color to an object that increases the performance of computer system 212. In other words, color manager 214 in computer system 212 is directed to a practical application of processes integrated into color manager 214 in computer system 212 that identify an inkjet printer to apply a color to an object. In this illustrative example, color manager 214 in computer system 212 determines whether a position of the color selected for the object is within a point cloud defining color application capabilities for an inkjet printer. The position is in a three-dimensional space for a color space. The inkjet printer is selected by the computer system for use in applying the color to the object when the color is within the point cloud defining the color application capabilities of the inkjet printer that results in a desired accuracy. The desired accuracy of applying the color to meet a specification of the color in a color space to an object using an inkjet printer is controlled by computer system 212. In this manner, color manager 214 in computer system 212 provides a practical application of applying a color to an object, such as aircraft, such that the functioning of computer system 212 is improved.

The illustration of color application environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, automated color system 208 can identify a number of colors in addition to or in place of color 202. Further, color manager 214 can apply these different colors in place of or in addition to the painting of colors by currently used painting mechanisms for object 204 such as aircraft 206 to form an aircraft livery for aircraft 206.

In still other illustrative examples, inkjet printers 228 can be considered components external to automated color system 208. In still other illustrative examples, instructions 252 can be generated by another software or hardware component in addition to or in place of color manager 214.

Figure 3:
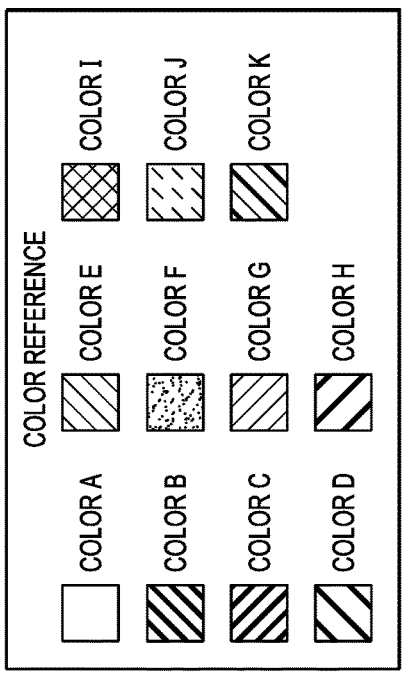
FIG. 3 is an illustration of an extraction of information from a drawing of an aircraft in accordance with an illustrative embodiment.
Figure 3:
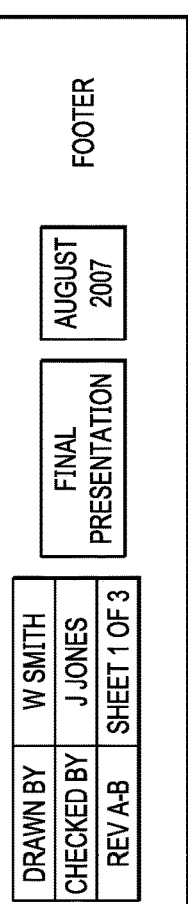
Figure 3:
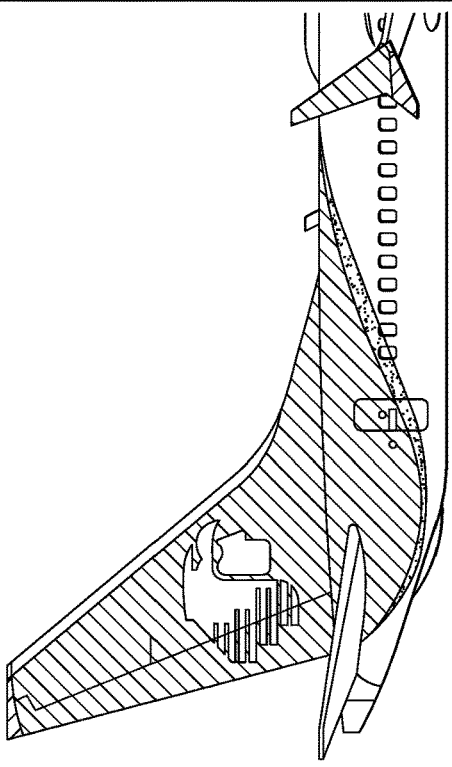

Turning next to FIG. 3, an illustration of an extraction of information from a drawing of an aircraft is depicted in accordance with an illustrative embodiment. In this illustrative example, drawing 300 is an example of design 216 in FIG. 2. Drawing 300 is a two-dimensional drawing in this example and is a view in a computer-aided design model or created using the computer-aided design model. In this illustrative example, table 302 is an example of information that can be extracted by processing drawing 300. In this illustrative example, information identified from drawing 300 in table 302 includes program name 304, revision 306, customer 308, date 310, color code 312 for the color, location 314, area 316 in which the color is to be applied, and color space value 318. As depicted, a color space value provides a position of the color to identify color code 312 in a color space. This information can be used to determine whether the color can be applied by a particular inkjet printer.

With reference now to FIG. 4, an illustration of Euclidean distances determined for colors to point clouds is depicted in accordance with an illustrative embodiment. In this illustrative example, table 400 illustrates positions of colors relative to point clouds for color application capabilities of inkjet printers. As depicted, table 400 includes columns for color code 402, position 404, Euclidean distance (dE) 406, nearest point cloud 408, and inkjet printer identifier 410.

In this example, color code 402 identifies the color to be applied to an exterior of an aircraft in this example. Position 404 identifies a position in the color in the color space. In this illustrative example, the color space is a LAB color space. Euclidean distance 406 is the nearest distance from the position of the color to a point cloud for a particular inkjet printer. Nearest point cloud 408 is the nearest point in the point cloud to the position of the color.

In this depicted example, entries are present for five colors to be applied to the exterior of the aircraft. In this example, the colors include color A 420, color B 422, color C 424, color D 426, and color E 428.

In this example, the inkjet printer with the point cloud having the nearest Euclidean distance to the position of a color can be selected to apply the color to the aircraft. For example, color A 420 has point clouds for inkjet printers that can be considered for applying color A 420. In this example, inkjet4 is the inkjet printer having the closest distance to the position of color A 420 with a dE of 0.771423554. The point cloud with the closest distance can also be referred to as the nearest point cloud in this illustrative example. As another example, for color B 422, inkjet4 is the inkjet printer having the closest distance to the position of color B 422 with a dE of 2.084864427.

In this illustrative example, if the distance threshold is 1.5, inkjet4 is selected as the inkjet printer that can apply an alternate color from color A 420. With color B 422, an alert is generated even though inkjet4 is the inkjet printer having the nearest distance to the position of color B 422. The alert is generated because this Euclidean distance is not within the threshold limit of 1.5.

Figure 5:
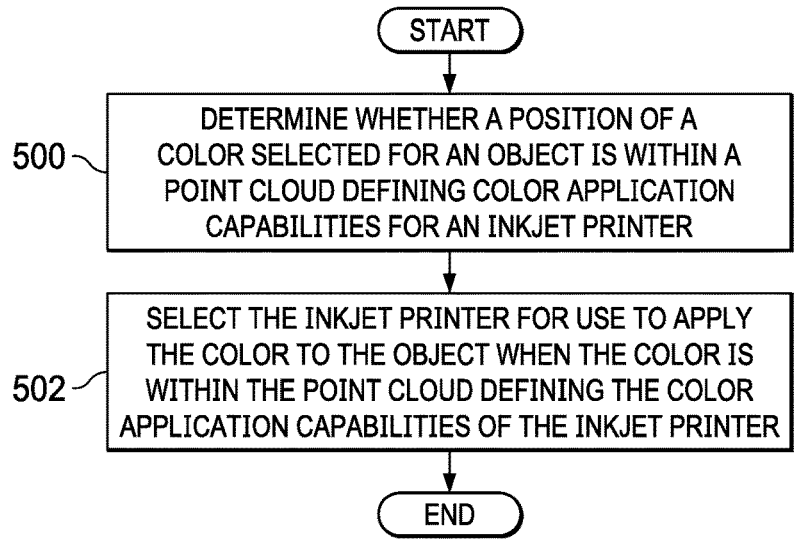
FIG. 5 is an illustration of a flowchart of a process for applying a color to an object in accordance with an illustrative embodiment.

Turning next to FIG. 5, an illustration of a flowchart of a process for applying a color to an object is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in color manager 214 in computer system 212 in FIG. 2. This process can be utilized to apply a color to at least one of an exterior or an interior of an object such as object 204 in the form of aircraft 206 in FIG. 2.

The process begins by determining whether a position of a color selected for an object is within a point cloud defining color application capabilities for an inkjet printer (operation 500). In operation 500, the position is in a three-dimensional space for a color space. For example, with a LAB color space, the coordinates are l=lightness, a=green axis, and b=blue axis.

The process selects the inkjet printer for use to apply the color to the object when the color is within the point cloud defining the color application capabilities of the inkjet printer (operation 502). The process terminates thereafter. The process can apply the color to the object using the selected inkjet printer.

Figure 6:
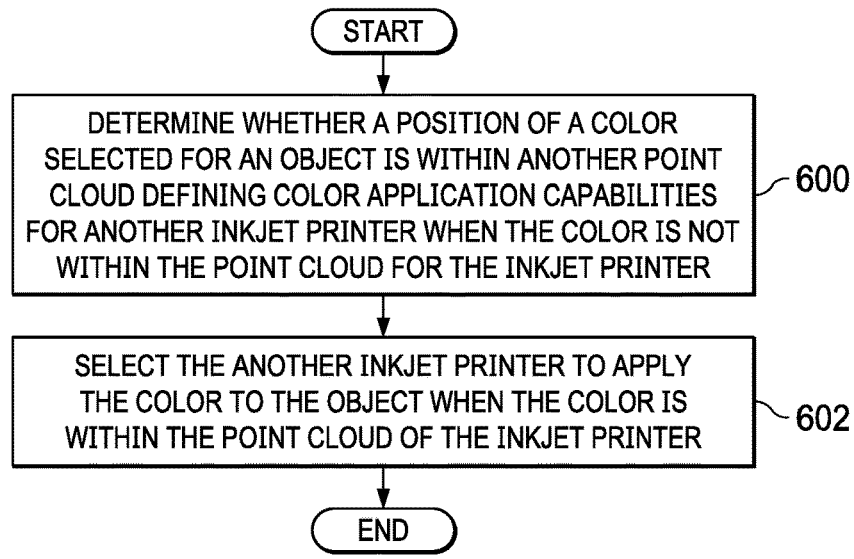
FIG. 6 is an illustration of a flowchart of a process for applying a color to an object in accordance with an illustrative embodiment.

Turning next to FIG. 6, an illustration of a flowchart of a process for applying a color to an object is depicted in accordance with an illustrative embodiment. In this illustrative example, this flowchart illustrates additional steps that can be performed as part of the flowchart in FIG. 5. These steps can be performed when the position of the color is not within the point cloud of the inkjet printer in operation 502 in FIG. 5.

Figure 7:
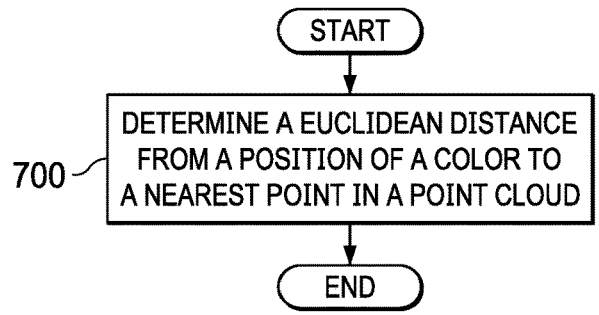
FIG. 7 is an illustration of a process for determining whether a position of a color is within a point cloud in accordance with an illustrative embodiment.

The process determines whether a position of a color selected for an object is within another point cloud defining color application capabilities for another inkjet printer when the color is not within the point cloud for the inkjet printer (operation 600). The process selects the another inkjet printer to apply the color to the object when the color is within the point cloud of the inkjet printer (operation 602). The process terminates thereafter Turning for FIG. 7, an illustration of a process for determining whether a position of a color is within a point cloud is depicted in accordance with an illustrative embodiment. The process illustrated in FIG. 7 is an example of one manner in which operation 500 in FIG. 5 can be implemented.

The process determines a Euclidean distance from a position of a color to a nearest point in a point cloud (operation 700). In operation 700, the position of the color is within the point cloud when the Euclidean distance is zero. The process terminates thereafter.

Figure 8:
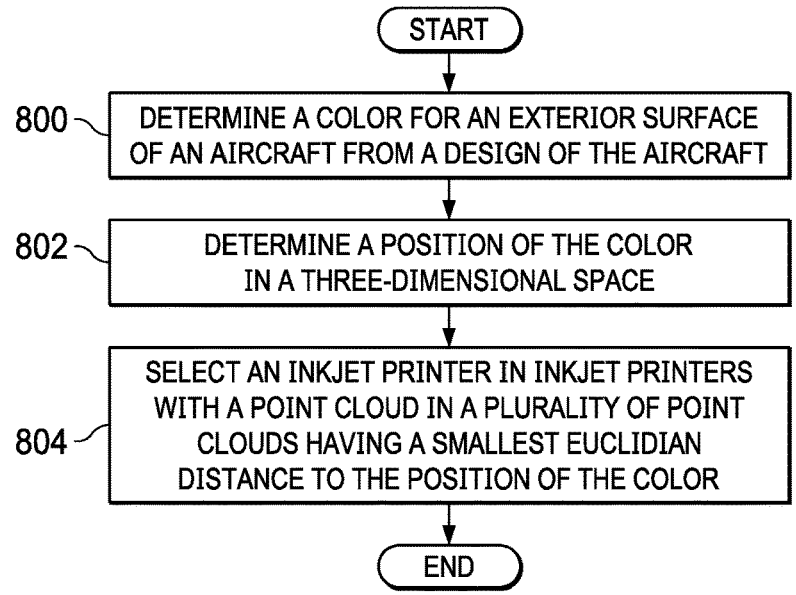
FIG. 8 is an illustration of a flowchart of a process for applying a color to an aircraft in accordance with an illustrative embodiment.

Turning now to FIG. 8, an illustration of a flowchart of a process for applying a color to an aircraft is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in color manager 214 in computer system 212 in FIG. 2.

The process begins by determining a color for an exterior surface of an aircraft from a design of the aircraft (operation 800). The process determines a position of the color in a three-dimensional space (operation 802). In operation 802, the position is in a color space coordinate system.

The process selects an inkjet printer in inkjet printers with a point cloud in a plurality of point clouds having a smallest Euclidean distance to the position of the color (operation 804). In operation 804, points in the plurality of point clouds represent colors that can be applied by the inkjet printers to the aircraft. In operation 804, the inkjet printer selected can be used to apply the color on the exterior surface of the aircraft. The process terminates thereafter.

In this flowchart, the inkjet printer with the smallest Euclidean distance to position of the color can be zero. A distance of zero means the position of the color is on or within the point cloud.

Figure 9:
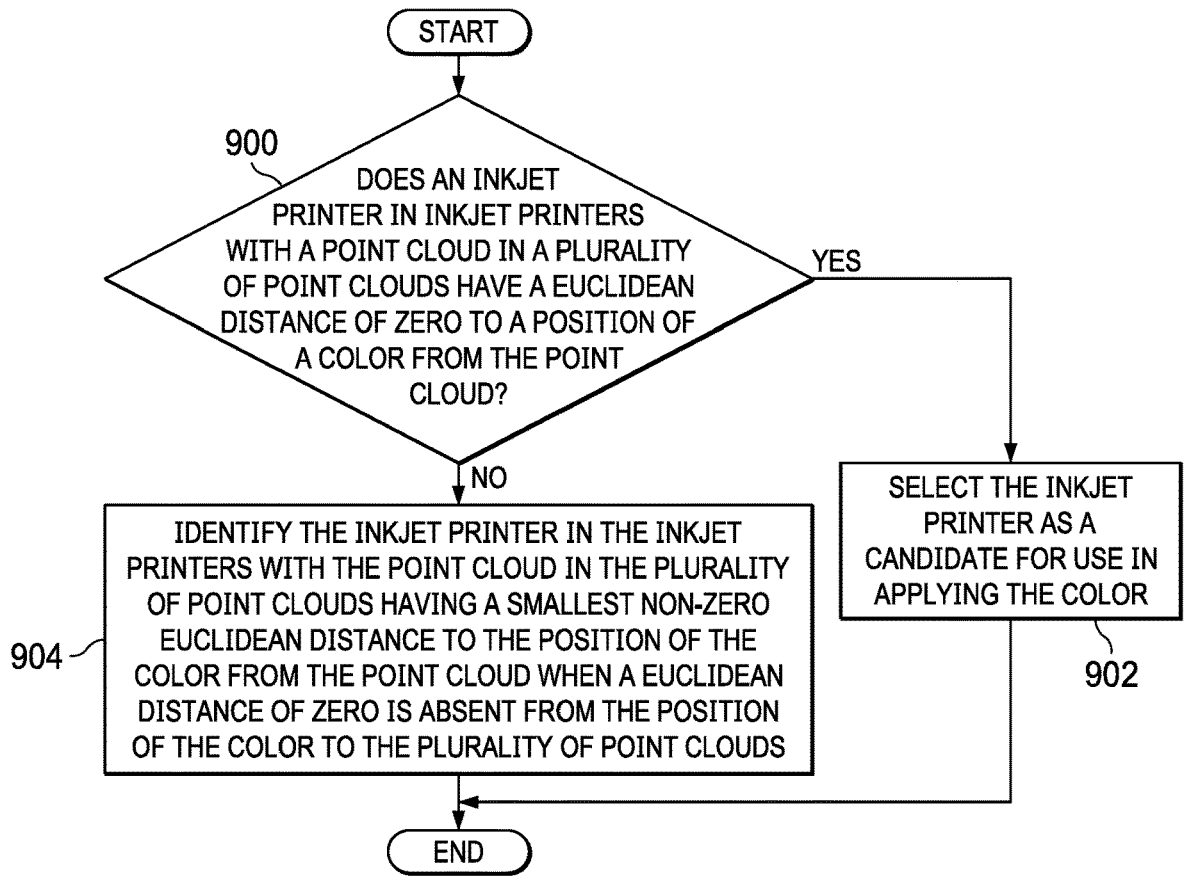
FIG. 9 is another illustration of a flowchart of a process for applying a color to an aircraft in accordance with an illustrative embodiment.

With reference to FIG. 9, an illustration of a flowchart of a process for applying a color to an aircraft is depicted in accordance with an illustrative embodiment. The process in FIG. 9 is an example of one manner in which operation 804 in FIG. 8 can be implemented.

The process begins by determining whether an inkjet printer in inkjet printers with a point cloud in a plurality of point clouds has a Euclidean distance of zero to a position of a color from the point cloud. (operation 900). If the point cloud has a zero distance to the position of the color from the point cloud, the process selects the inkjet printer as a candidate for use in applying the color (operation 902). The process terminates thereafter.

With reference again to operation 900, if a zero distance is not present, the process identifies the inkjet printer in the inkjet printers with the point cloud in the plurality of point clouds having a smallest non-zero Euclidean distance to the position of the color from the point cloud when a Euclidean distance of zero is absent from the position of the color to the plurality of point clouds (operation 904). The process terminates thereafter.

Figure 10:
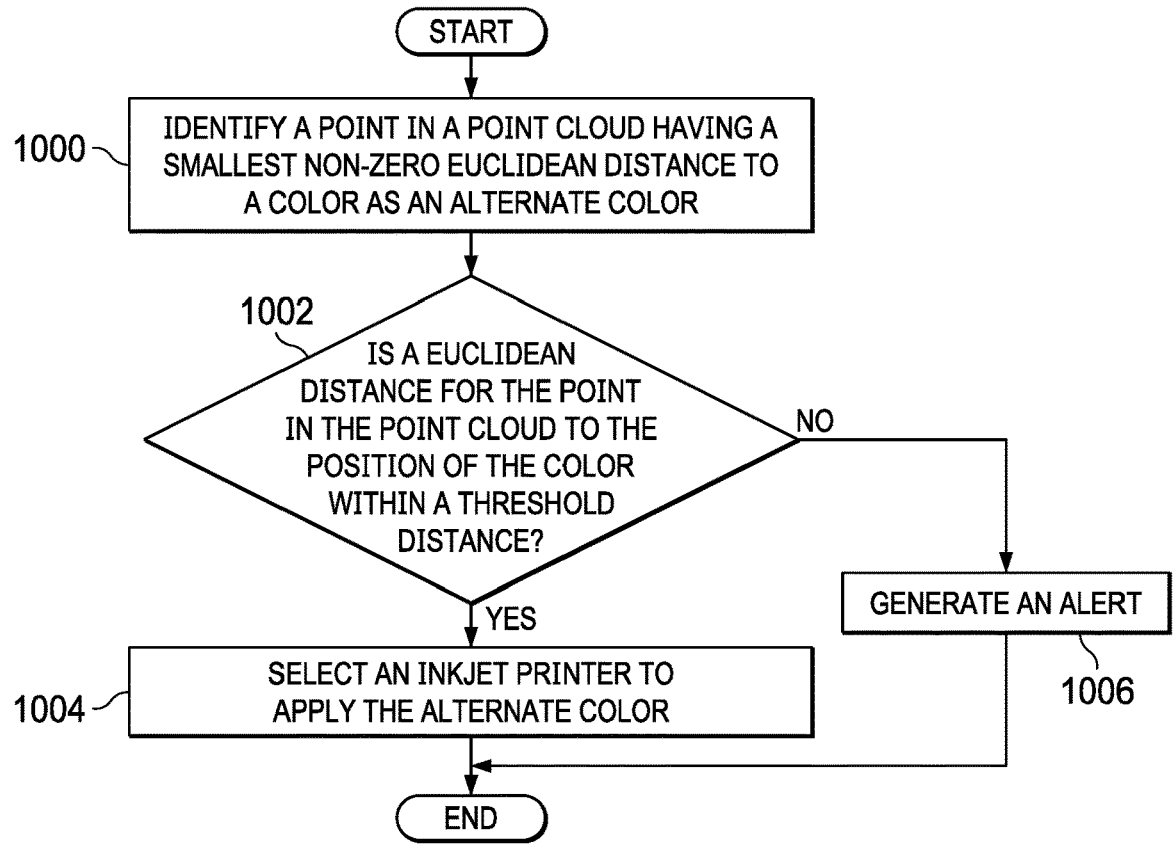
FIG. 10 is an illustration of a flowchart of a process for selecting an inkjet printer when a non-zero distance to a point cloud is present in accordance with an illustrative embodiment.

With reference next to FIG. 10, an illustration of a flowchart of a process for selecting an inkjet printer when a non-zero Euclidean distance to a point cloud is present is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in color manager 214 in computer system 212 in FIG. 2.

The process identifies a point in a point cloud having a smallest non-zero Euclidean distance to a color as an alternate color (operation 1000). This alternate color is an approximation of the color. The process determines whether a Euclidean distance for the point in the point cloud to the position of the color is within a threshold distance (operation 1002). The threshold distance in operation 1002 is selected as to indicate when a color is sufficiently close to use as an alternate color. For example, the threshold distance can be selected such the difference between the color and the alternate color is not perceptible by a human eye.

In operation 1002, the threshold distance can be selected in a number of different ways. The threshold distance can be one in which a person cannot perceive the difference between the color and the alternate color.

If the Euclidean distance is within the threshold, the process selects an inkjet printer to apply the alternate color (operation 1004). The process terminates thereafter. If the Euclidean distance is greater than the threshold distance, the process generates an alert (operation 1006). The process terminates thereafter. This alert can indicate that the color that can be applied by the inkjet printer is too different from the color selected by a customer. With this alert, a number of different actions can be taken. For example, the customer can be consulted with respect to the color selection. As another example, additional inkjet printers can be identified and analyzed to determine whether these additional inkjet printers can apply the desired color.

Figure 11:
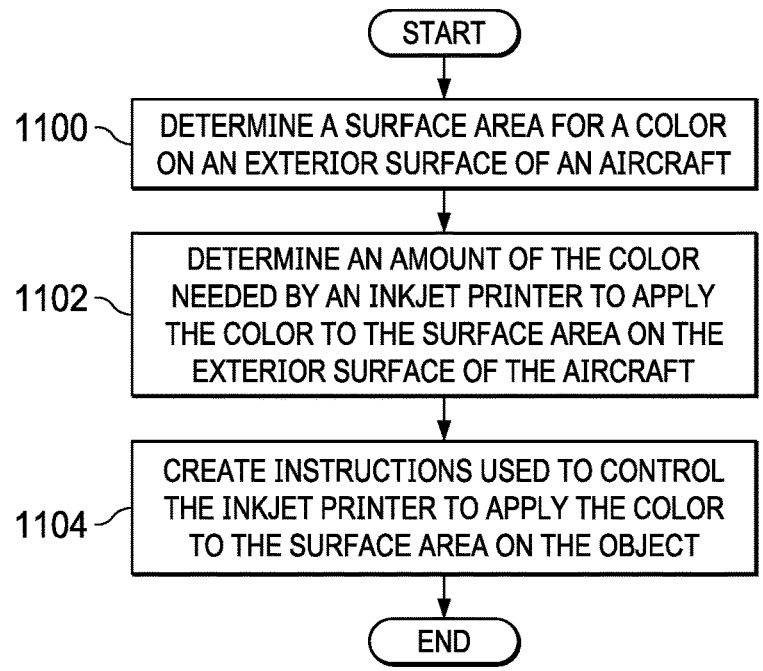
FIG. 11 is an illustration of a flowchart of a process for creating instructions to apply a color to an object in accordance with an illustrative embodiment.

Turning next to FIG. 11, an illustration of a flowchart of a process for creating instructions to apply a color to an object is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in color manager 214 in computer system 212 in FIG. 2.

The process begins by determining a surface area for a color on an exterior surface of an aircraft (operation 1100). In operation 1100, the surface area is determined using a design of the aircraft. The process determines an amount of the color needed by an inkjet printer to apply the color to the surface area on the exterior surface of the aircraft (operation 1102). The process creates instructions used to control the inkjet printer to apply the color to the surface area on the object (operation 1104). The process terminates thereafter.

Figure 12:
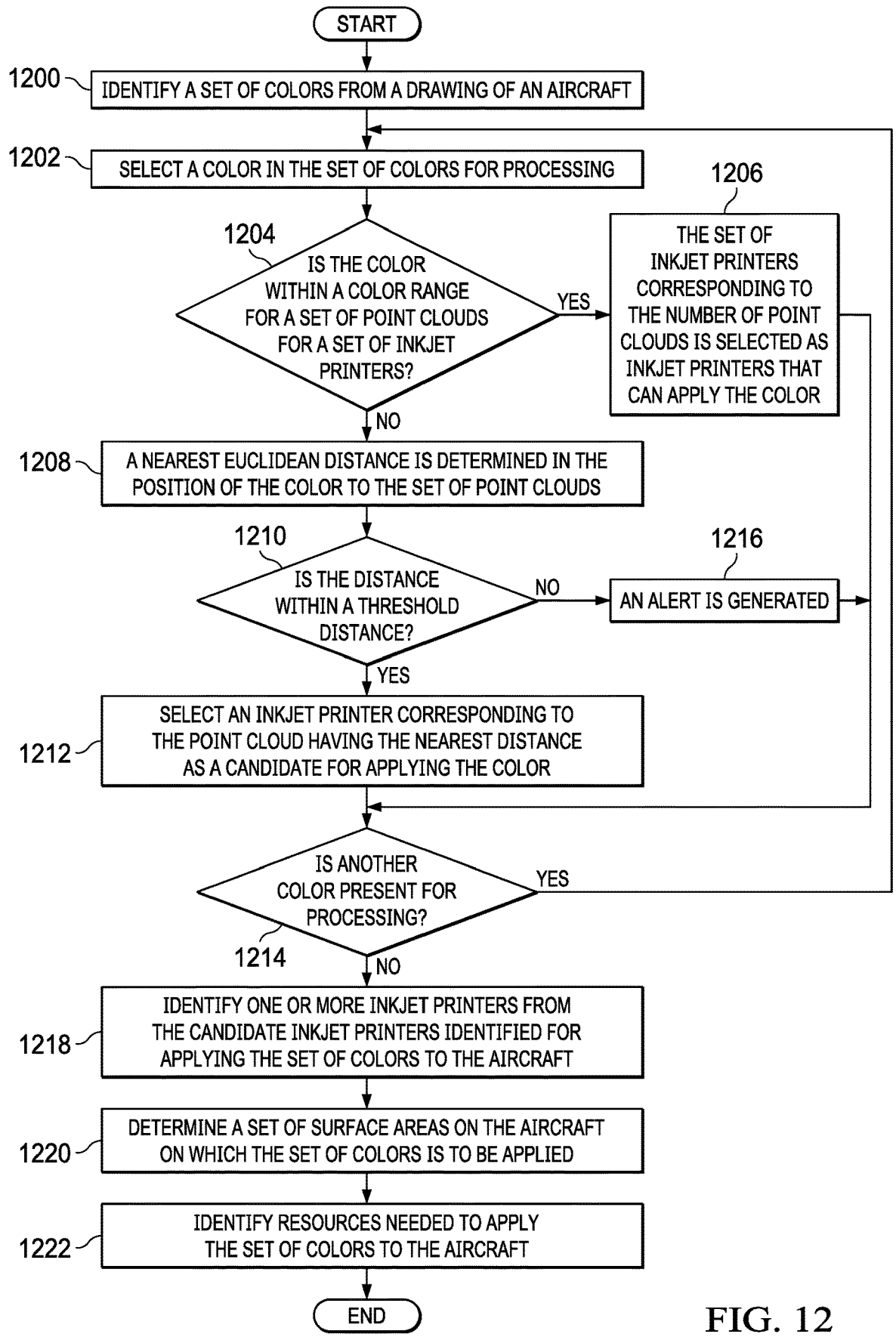
FIG. 12 is an illustration of a flowchart of a process for selecting an inkjet printer for applying colors on an aircraft in accordance with an illustrative embodiment.

Turning now to FIG. 12, an illustration of a flowchart of a process for selecting an inkjet printer for applying colors to an aircraft is depicted in accordance with an illustrative embodiment. The process in FIG. 12 can be implemented in hardware, software, or both. When implemented in software, the process can take the form of program code that is run by one or more processor units located in one or more hardware devices in one or more computer systems. For example, the process can be implemented in color manager 214 in computer system 212 in FIG. 2. This process can be utilized to apply color to at least one of an exterior or an interior of an object such as object 204 in the form of aircraft 206 in FIG. 2.

The process begins by identifying a set of colors from a drawing of an aircraft (operation 1200). In operation 1200, the set of colors can be identified by performing image processing on the drawing. This image processing can include optical character recognition. In this operation, information such as customer name, program name, livery dates, revision number, and color codes can be identified.

The process then selects a color in the set of colors for processing (operation 1202). The process determines whether the color is within a color range for a set of point clouds for a set of inkjet printers (operation 1204). In operation 1204, the color is within the color range for the point cloud when the color has a position in a color space that is inside of the point. This determination can be made using a robust inside-outside segmentation using generalized winding numbers.

If the color is within the color range for a number of point clouds in the set of point clouds, the set of inkjet printers corresponding to the number of point clouds is selected as inkjet printers that can apply the color (operation 1206).

Otherwise, a nearest Euclidean distance is determined in the position of the color to the set of point clouds (operation 1208). In operation 1208, the process identifies the point cloud in the set of point clouds for the set of inkjet printers having the nearest Euclidean distance. In this example, an assumption is made that only one of the point clouds will have a nearest Euclidean distance.

In operation 1208, the Euclidean distance can be determined in a LAB color space as follows:

dE is the difference between a reference color $(L_1^*, a_1^*, b_1^*)$ and another color $(L_2^*, a_2^*, b_2^*)$ $$dE = \sqrt{(\Delta L^*/k_L S_L)^2 + (\Delta C_{ab}^*/k_C S_C)^2 + (\Delta H_{ab}^*/k_H S_H)^2}$$

Where, $\Delta L^* = L_1^* - L_2^*$ $C_1^* = \sqrt{a_1^{*2} + b_1^{*2}}$ $C_2^* = \sqrt{a_2^{*2} + b_2^{*2}}$ $\Delta C_{ab}^* = C_1^* - C_2^*$ $\Delta H_{ab}^* = \sqrt{\Delta E_{ab}^{*2} - \Delta L^{*2} - \Delta C_{ab}^{*2}}$ $\Delta a^* = a_1^* - a_2^*$ $\Delta b^* = b_1^* - b_2^*$ $S_L = 1$ $S_c = 1 + K_1 C_1^*$ $S_H = 1 + K_2 C_1^*$ And where $k_C$ and $k_H$ are usually both unity and the weighting factors $k_L$, $K_1$ and $K_2$.

The process then determines whether the distance is within a threshold distance (operation 1210). If the distance is within the threshold distance, the process then selects an inkjet printer corresponding to the point cloud having the nearest distance as a candidate for applying the color (operation 1212).

A determination is then made as to whether another color is present for processing (operation 1214). The process also proceeds to the determination in operation 1214 from operation 1206 in this example.

If another color is present that has not been processed, the process returns to operation 1202.

With reference again to operation 1210, if the distance is not within the threshold, an alert is generated (operation 1216). In operation 1216, the alert can be used as an indication that additional inkjet printers should be identified for consideration to apply the color. The process then proceeds to operation 1214.

With reference again to operation 1214, if additional colors are not present for processing, the process then identifies one or more inkjet printers from the candidate inkjet printers identified for applying the set of colors to the aircraft (operation 1218). More than one inkjet printer may be present that is capable for applying a particular color. The inkjet printers selected can be ones that can print most or all of the colors identified for the aircraft.

The process then determines a set of surface areas on the aircraft on which the set of colors is to be applied (operation 1220). The process then identifies resources needed to apply the set of colors to the aircraft (operation 1222). The process terminates thereafter. These resources identified in operation 1222 include an amount of color and an availability of the selected inkjet printers. For example, multiple inkjet printers of the same type can be selected to increase the speed at which color can be applied. The identification of these resources in operation 1222 can be used to schedule and indicate how much time is needed to apply the color. This determination can be used to determine how this portion of the manufacturing process of the aircraft affects the delivery date of the aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
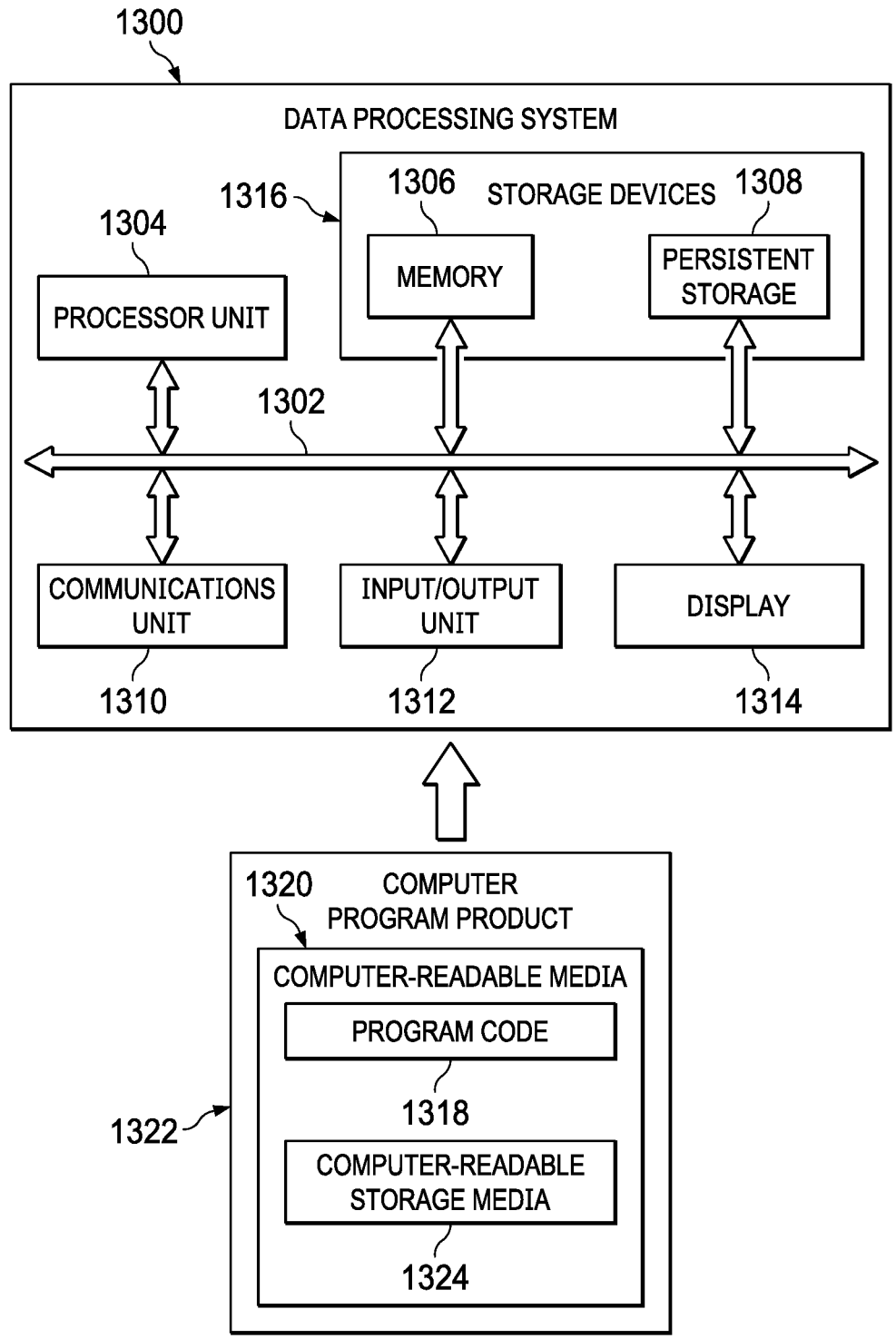
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 can be used to implement server computer 104, server computer 106, and client devices 110 in FIG. 1. Data processing system 1300 can also be used to implement computer system 212 in FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 can take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 can provide a connection for user input through at least one of a keyboard, a mouse, or some other suitable input device. Further, input/output unit 1312 can send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which can be located in a memory, such as memory 1306.

These instructions are referred to as program code, computer usable program code, or computer-readable program code that can be read and executed by a processor in processor unit 1304. The program code in the different embodiments can be embodied on different physical or computer-readable storage medium, such as memory 1306 or persistent storage 1308.

Program code 1318 is located in a functional form on computer-readable medium 1320 that is selectively removable and can be loaded onto or transferred to data processing system 1300 for execution by processor unit 1304. Program code 1318 and computer-readable medium 1320 form computer program product 1322 in these illustrative examples. In the illustrative example, computer-readable medium 1320 is computer-readable storage medium 1324.

In these illustrative examples, computer-readable storage medium 1324 is a physical or tangible storage device used to store program code 1318 rather than a medium that propagates or transmits program code 1318. Computer readable storage medium 1318, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1318 can be transferred to data processing system 1300 using a computer-readable signal media. The computer-readable signal media can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1320" can be singular or plural. For example, program code 1318 can be located in computer-readable media 1320 in the form of a single storage device or system. In another example, program code 1318 can be located in computer-readable media 1320 that is distributed in multiple data processing systems. In other words, some instructions in program code 1318 can be located in one data processing system while other instructions in program code 1318 can be located in one data processing system. For example, a portion of program code 1318 can be located in computer-readable media 1320 in a server computer while another portion of program code 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, can be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Figure 14:
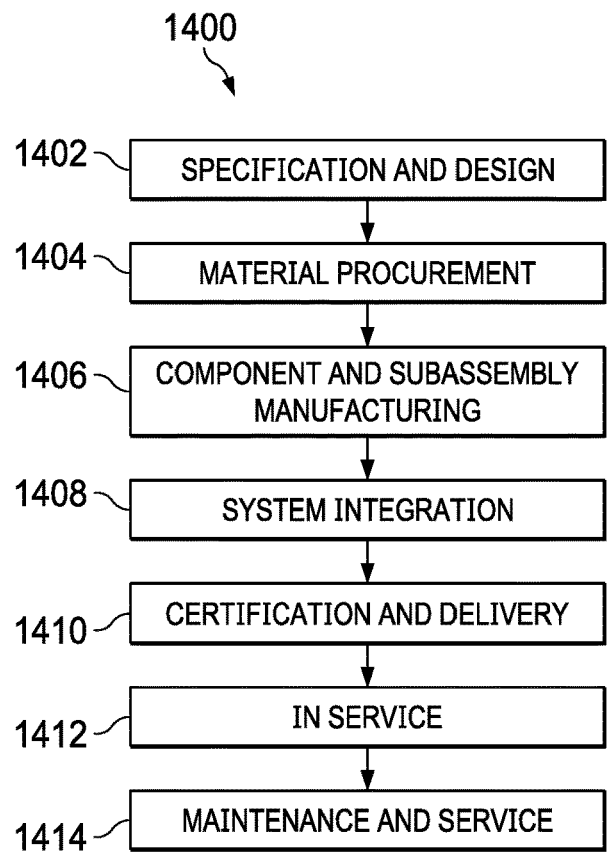
FIG. 14 is an illustration of an aircraft manufacturing and service method in accordance with an illustrative embodiment.
Figure 15:
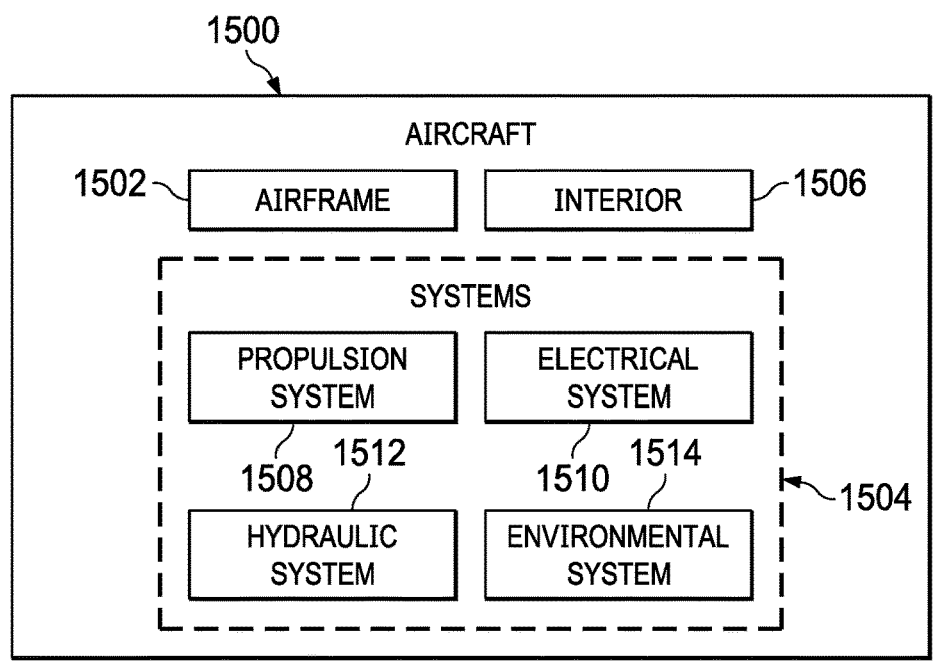
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 can go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 can be fabricated or manufactured in a manner similar to components or subassemblies produced while aircraft 1500 is in service 1412 in FIG. 14. As yet another example, one or more apparatus embodiments, method embodiments, or a combination thereof can be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both. The use of a number of the different illustrative embodiments may substantially expedite the assembly of aircraft 1500, reduce the cost of aircraft 1500, or both expedite the assembly of aircraft 1500 and reduce the cost of aircraft 1500.

For example, color manager 214 in FIG. 2 can be used during at least one of component and subassembly manufacturing 1406 or system integration 1408 of aircraft 1500 in FIG. 15 to more quickly and efficiently applied colors to aircraft 1500 as compared to current techniques. Further, color manager 214 can be used during maintenance and service 1414 to applied colors to aircraft 1500 as part of include modification, reconfiguration, refurbishment, and other maintenance or service of aircraft 1500.

Figure 16:
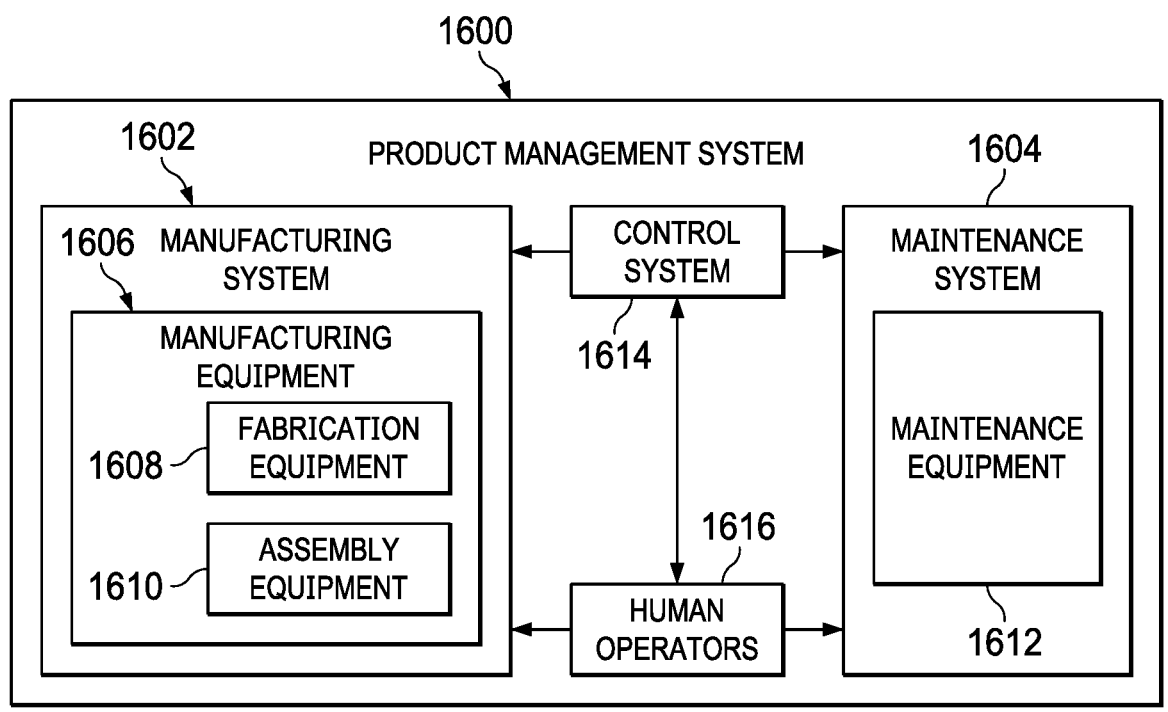
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 includes at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that used to fabricate components for parts used to form aircraft 1500 in FIG. 15. For example, fabrication equipment 1608 can include machines and tools. These machines and tools can be at least one of a drill, a hydraulic press, a furnace, a mold, a composite tape laying machine, a vacuum system, a lathe, or other suitable types of equipment. Fabrication equipment 1608 can be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500 in FIG. 15. In particular, assembly equipment 1610 is used to assemble components and parts to form aircraft 1500 in FIG. 15. Assembly equipment 1610 also can include machines and tools. These machines and tools may be at least one of a robotic arm, a crawler, a fastener installation system, a rail-based drilling system, or a robot. Assembly equipment 1610 can be used to assemble parts such as seats, horizontal stabilizers, wings, engines, engine housings, landing gear systems, and other parts for aircraft 1500 in FIG. 15.

In this illustrative example, maintenance system 1604 includes maintenance equipment 1612. Maintenance equipment 1612 can include any equipment needed to perform maintenance on aircraft 1500 in FIG. 15. Maintenance equipment 1612 may include tools for performing different operations on parts on aircraft 1500 in FIG. 15. These operations can include at least one of disassembling parts, refurbishing parts, inspecting parts, reworking parts, manufacturing replacement parts, or other operations for performing maintenance on aircraft 1500 in FIG. 15. These operations can be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable devices. In some cases, maintenance equipment 1612 can include fabrication equipment 1608, assembly equipment 1610, or both to produce and assemble parts that needed for maintenance.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 can control the operation of at least one of fabrication equipment 1608, assembly equipment 1610, or maintenance equipment 1612.

The hardware in control system 1614 can be implemented using hardware that may include computers, circuits, networks, and other types of equipment. The control may take the form of direct control of manufacturing equipment 1606. For example, robots, computer-controlled machines, and other equipment can be controlled by control system 1614. In other illustrative examples, control system 1614 can manage operations performed by human operators 1616 in manufacturing or performing maintenance on aircraft 1500. For example, control system 1614 can assign tasks, provide instructions, display models, or perform other operations to manage operations performed by human operators 1616. In these illustrative examples, color manager 214 in FIG. 2 can be implemented in control system 1614 to manage at least one of the manufacturing or maintenance of aircraft 1500 in FIG. 15. For example, color manager 214 can operate to select inkjet printers for use in applying colors to a product such as aircraft 1500. Further, color manager 214 can control operation of the inkjet printers to apply the colors to a product such as aircraft 1500.

In the different illustrative examples, human operators 1616 can operate or interact with at least one of manufacturing equipment 1606, maintenance equipment 1612, or control system 1614. This interaction can occur to manufacture aircraft 1500 in FIG. 15.

Of course, product management system 1600 may be configured to manage other products other than aircraft 1500 in FIG. 15. Although product management system 1600 has been described with respect to manufacturing in the aerospace industry, product management system 1600 can be configured to manage products for other industries. For example, product management system 1600 can be configured to manufacture products for the automotive industry as well as any other suitable industries.

Thus, the illustrative examples provide a method, apparatus, system, and computer program product for applying a color to an aircraft. The color for an exterior surface of the aircraft is determined by a computer system from a design of the aircraft. A position of the color in a three-dimensional space is determined by the computer system. The position is in a color space coordinate system. An inkjet printer in the inkjet printers with a point cloud in the plurality of point clouds having a smallest Euclidean distance to the position of the color is selected by the computer system. The inkjet printer is used to apply the color on the exterior surface of the aircraft.

In the illustrative example, the different processes can be performed automatically to identify a set of colors from a design and select one or more inkjet printers to apply the color to an object such as an aircraft. The illustrative examples can be applied to manufacturing objects such as aircraft, ground vehicles, spacecraft, ships, and other objects in which a color is to be applied to the objects.

One or more technical solutions are present in the illustrative examples that overcome a technical problem with applying colors to an aircraft. As a result, one or more technical solutions can provide a technical effect enabling applying a color to an aircraft or other type of object more quickly as compared to current techniques. In the illustrative example, one or more technical solutions enable reducing the time needed to identify an inkjet printer to apply one or more colors for an aircraft livery or a color scheme for other objects from a design such as a drawing.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for applying a color to an aircraft, the method comprising:
    determining, by a computer system, the color for an exterior surface of the aircraft from a design of the aircraft;
    determining, by the computer system, a position of the color in a three-dimensional space, wherein the position is in a color space coordinate system; and
    selecting, by the computer system, an inkjet printer in inkjet printers with a point cloud in a plurality of point clouds having a smallest Euclidean distance to the position of the color, wherein the inkjet printer is used to apply the color on the exterior surface of the aircraft and identifying, by the computer system, the inkjet printer in the inkjet printers with the point cloud in the plurality of point clouds having a smallest non-zero Euclidean distance to the position of the color when a Euclidean distance of zero is absent from the position of the color to the plurality of point clouds.

2. The method of claim 1 further comprising:
    applying, by the computer system, the color to the aircraft using the inkjet printer.

3. The method of claim 1, wherein selecting, by the computer system, the inkjet printer in the inkjet printers with the point cloud in the plurality of point clouds having the smallest Euclidean distance to the position of the color comprises:
    identifying, by the computer system, the inkjet printer in the inkjet printers with the point cloud in the plurality of point clouds having the Euclidean distance of zero to the position of the color from the point cloud.

4. The method of claim 1, wherein the smallest non-zero Euclidean distance to the color is an alternate color that is an approximation of the color.

5. The method of claim 4, further comprising:
    using, by the computer system, the alternate color in place of the color when the smallest Euclidean distance is within a threshold distance.

6. The method of claim 1 further comprising:
    determining, by the computer system, a surface area for the color on the exterior surface of the aircraft, wherein the surface area is determined using the design of the aircraft; and
    determining, by the computer system, an amount of color needed by the inkjet printer to apply the color to the surface area on the exterior surface of the aircraft.

7. The method of claim 6 further comprising:
    creating, by the computer system, instructions used to control the inkjet printer to apply the color to the surface area on the aircraft.

8. The method of claim 1, wherein the plurality of point clouds is for the color space that is one of a LAB color space, an LMS color space, and an XYZ color space.

9. The method of claim 1 further comprising:
    determining, by the computer system, a color code for the color selected from the design of the aircraft.

10. A method for applying a color to an object, the method comprising:
    determining, by a computer system, whether a position of the color selected for the object is within a point cloud of a plurality of point clouds defining color application capabilities for an inkjet printer in inkjet printers, wherein the position is in a three-dimensional space for a color space;
    determining, by the computer system, whether a Euclidean distance from the position of the color is zero to any of the plurality of point clouds defining color application capabilities for the inkjet printers; and
    selecting, by the computer system, the inkjet printer for use to apply the color to the object when the color is within the point cloud defining the color application capabilities of the inkjet printer and identifying, by the computer system, the inkjet printer with the point cloud having a smallest non-zero Euclidean distance to the position of the color when a Euclidean distance of zero is absent from the position of the color to the plurality of point clouds.

11. The method of claim 10 further comprising:
    applying, by the computer system, the color to the object using the inkjet printer.

12. The method of claim 10 further comprising:
    determining, by the computer system, whether the position of the color selected for the object is within another point cloud defining the color application capabilities for another inkjet printer when the color is not within the point cloud for the inkjet printer.

13. The method of claim 10, wherein determining, by the computer system, whether the position of the color selected for the object is within the point cloud of the plurality of point clouds defining the color application capabilities for the inkjet printer, wherein the position is in the three-dimensional space for the color space comprises:
    determining, by the computer system, a Euclidean distance from the position of the color to a nearest point in the point cloud, wherein the position of the color is within the point cloud when the Euclidean distance is zero.

14. The method of claim 10 further comprising:
    determining, by the computer system, a color code for the color selected from a design of the object.

15. The method of claim 10 further comprising:
    determining, by the computer system, a surface area for the color on the object, wherein the surface area is determine using a design of the object; and
    determining, by the computer system, an amount of paint needed to apply the color to the surface area.

16. The method of claim 15 further comprising:
    creating, by the computer system, instructions for controlling the inkjet printer to apply the color to the surface area on the object.

17. The method of claim 10, wherein the point cloud is for the color space that is one of a LAB color space, an LMS color space, and an XYZ color space.

18. The method of claim 10, wherein the object is selected from a group comprising a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a skin panel, a wall, a door, a fuselage, an engine housing, a wing, and a fairing.

19. The method of claim 10, wherein the smallest non-zero Euclidean distance to the color is an alternate color that is an approximation of the color.

20. An automated color system comprising:
a computer system; and
a color manager in the computer system, wherein the color manager is configured to:
determine a color for an exterior surface of an aircraft from a design of the aircraft;
determine a position of the color in a three-dimensional space, wherein the position is in a color space coordinate system;
determine whether a Euclidean distance from the position of the color is zero to any of a plurality of point clouds defining color application capabilities for inkjet printers, wherein points in the plurality of point clouds represent colors that can be applied by the inkjet printers; and
select an inject printer in the inkjet printers with a point cloud in the plurality of point clouds having a smallest Euclidean distance to the position of the color, wherein the inkjet printer is used to apply the color to the exterior surface of the aircraft and identify the inkjet printer in the inkjet printers with the point cloud in the plurality of point clouds having a smallest non-zero Euclidean distance to the position of the color when a Euclidean distance of zero is absent from the position of the color to the plurality of point clouds.

21. The automated color system of claim 20, wherein the color manager is configured to:
apply the color to the aircraft using the inkjet printer.

22. The automated color system of claim 20, wherein in selecting the inject printer in the inkjet printers with the point cloud in the plurality of point clouds having the smallest Euclidean distance to the position of the color, the color manager is configured to:
identify the inkjet printer in the inkjet printers with the point cloud in the plurality of point clouds having the Euclidean distance of zero to the position of the color from the point cloud.

23. The automated color system of claim 20, wherein the smallest non-zero Euclidean distance to the color is an alternate color that is an approximation of the color.

24. The automated color system of claim 23, wherein the color manager is configured to:
use the alternate color in place of the color when the smallest Euclidean distance is within a threshold distance.

25. The automated color system of claim 20, wherein the color manager is configured to:
determine a surface area for the color on the exterior surface of the aircraft, wherein the surface area is determined using the design of the aircraft; and
determine an amount of paint needed by the inkjet printer to apply the color to the surface area on the exterior surface of the aircraft.

26. The automated color system of claim 25, wherein the color manager is configured to:
create instructions used to control the inkjet printer to apply the color to the surface area on the aircraft.

27. The automated color system of claim 20, wherein the plurality of point clouds is for the color space that is one of a LAB color space, an LMS color space, and an XYZ color space.

28. An automated color system comprising:
a computer system; and
a color manager in the computer system, wherein the color manager is configured to:
determine whether a position of a color selected for an object is within a point cloud of a plurality of point clouds defining color application capabilities for an inkjet printer in inkjet printers, wherein the position is in a three-dimensional space for a color space;
determine whether a Euclidean distance from the position of the color is zero to any of the plurality of point clouds defining color application capabilities for the inkjet printers; and
select the inkjet printer for use to pain the object with the color when the color is within the point cloud defining color application capabilities of the inkjet printer and identify the inkjet printer with the point cloud having a smallest non-zero Euclidean distance to the position of the color when a Euclidean distance of zero is absent from the position of the color to the plurality of point clouds.

29. The automated color system of claim 28, wherein the color manager is configured to:
apply the color to the object the inkjet printer.

30. The automated color system of claim 28, wherein the color manager is configured to:
determine whether the position of the color selected for the object is within another point cloud of the plurality of point clouds defining the color application capabilities for another inkjet printer in the inkjet printers when the color is not within the point cloud for the inkjet printer.

31. The automated color system of claim 28, wherein in determining whether the position of the color selected for the object is within the point cloud of the plurality of point clouds defining the color application capabilities for the inkjet printer, wherein the position is in the three-dimensional space for the color space, the color manager is configured to:
determine a Euclidean distance from the position of the color to a nearest point in the point cloud, wherein the position of the color is within the point cloud when the Euclidean distance is zero.

32. The automated color system of claim 28, wherein the color manager is configured to:
determine a color code for the color selected for the object from a design of the object.

33. The automated color system of claim 28, wherein the color manager is configured to:
determine a surface area for the color on the object, wherein the surface area is determine using a design of the object; and
determine an amount of paint needed to apply the color to the surface area.

34. The automated color system of claim 33, wherein the color manager is configured to:

create instructions for controlling the inkjet printer to apply the color to the surface area on the object.

35. The automated color system of claim 28, wherein the point cloud is for the color space that is one of a LAB color space, an LMS color space, and an XYZ color space.

36. The automated color system of claim 28, wherein the object is selected from a group comprising a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a skin panel, a wall, a door, a fuselage, an engine housing, a wing, and a fairing.

37. A product management system comprising:
a set of inkjet printers; and
a controller in communication with the set of inkjet printers and wherein the controller is configured to:
  determine whether a position of a color selected for an object is within a point cloud of a plurality of point clouds defining color application capabilities for an inkjet printer in the set of inkjet printers, wherein the position is in a three-dimensional space for a color space;
  determine whether a Euclidean distance from the position of the color is zero to any of the plurality of point clouds defining color application capabilities for the inkjet printers; and
  select the inkjet printer for use to apply the color to the object when the color is within the point cloud defining the color application capabilities of the inkjet printer and identify the inkjet printer with the point cloud having a smallest non-zero Euclidean distance to the position of the color when a Euclidean distance of zero is absent from the position of the color to the plurality of point clouds; and
  control an operation of the inkjet printer to apply the color to the object.

38. The product management system of claim 37, wherein in determining whether the position of the color selected for the object is within the point cloud defining the color application capabilities for the inkjet printer, wherein the position is in a color space, the controller is configured to:
  determine a Euclidean distance from the position of the color to a nearest point in the point cloud, wherein the position of the color is within the point cloud when the Euclidean distance is zero.

39. The product management system of claim 37, wherein the controller is configured to:
  determine a color code for the color selected for the object from a design of the object.

40. The product management system of claim 37, wherein the controller is configured to:
  determine a surface area on the object for the color, wherein the surface area is determine using a design of the object; and
  determine an amount of paint needed to apply the color to the surface area.

41. The product management system of claim 37, wherein the set of inkjet printers are located in at least one of a manufacturing system or a maintenance system.

42. A computer program product for applying a color to an aircraft, the computer program product comprising:
a computer-readable storage media;
first program code, stored on the computer-readable storage media, executable by a computer system to cause the computer system to determine the color for an exterior surface of the aircraft from a design of the aircraft;
second program code, stored on the computer-readable storage media, executable by the computer system to cause the computer system to determine a position of the color in a three-dimensional space, wherein the position is in a color space coordinate system;
third program code, stored on the computer-readable storage media, executable by the computer system to cause the computer system to determine whether a Euclidean distance from the position of the color is zero to any of a plurality of point clouds defining color application capabilities for inkjet printers, wherein points in the plurality of point clouds represent colors that can be applied by the inkjet printers; and
fourth program code, stored on the computer-readable storage media, executable by the computer system to cause the computer system to select an inject printer in the inkjet printers with a point cloud in the plurality of point clouds having a smallest Euclidean distance to the position of the color, wherein the inkjet printer is used to apply the color to the exterior surface of the aircraft and identify the inkjet printer in the inkjet printers with the point cloud in the plurality of point clouds having a smallest non-zero Euclidean distance to the position of the color when a Euclidean distance of zero is absent from the position of the color to the plurality of point clouds.

43. A computer program product for applying a color to an aircraft, the computer program product comprising:
a computer-readable storage media;
first program code, stored on the computer-readable storage media, executable by a computer system to cause the computer system to determine whether a position of the color selected for an object is within a point cloud of a plurality of point clouds defining color application capabilities for an inkjet printer in inkjet printers, wherein the position is in three-dimensional space for a color space;
second program code, stored on the computer-readable storage media, executable by the computer system to cause the computer system to determine whether a Euclidean distance from the position of the color is zero to any of the plurality of point clouds defining color application capabilities for the inkjet printers; and
third program code, stored on the computer-readable storage media, executable by the computer system to cause the computer system to select the inkjet printer for use to paint the object with the color when the color is within the point cloud defining color application capabilities of the inkjet printer and identify the inkjet printer with the point cloud having a smallest non-zero Euclidean distance to the position of the color when a Euclidean distance of zero is absent from the position of the color to the plurality of point clouds.

* * * * *